United States Patent [19]

Chan

[11] Patent Number: 5,374,361
[45] Date of Patent: Dec. 20, 1994

[54] WELL CLEANOUT USING CAUSTIC ALKYL POLYGLYCOSIDE COMPOSITIONS

[75] Inventor: Albert F. Chan, Plano, Tex.

[73] Assignee: Atlantic Richfield Company, Los Angeles, Calif.

[21] Appl. No.: 219,249

[22] Filed: Mar. 29, 1994

Related U.S. Application Data

[63] Continuation of Ser. No. 863,529, Apr. 6, 1992, abandoned, which is a continuation of Ser. No. 647,867, Jan. 30, 1991, abandoned.

[51] Int. Cl.$^5$ .............................................. E21B 33/05
[52] U.S. Cl. ................................... 507/211; 166/312; 166/291; 507/221; 507/227; 507/228; 507/261; 507/262; 507/219; 507/927; 507/929; 507/234
[58] Field of Search ................... 252/8.551; 166/275, 166/304, 312

[56] References Cited

U.S. PATENT DOCUMENTS

| | | | |
|---|---|---|---|
| 1,484,601 | 2/1924 | Carmichael | 166/312 |
| 2,578,888 | 12/1951 | Kaveler | 252/8.5 |
| 3,120,266 | 2/1964 | Martin et al. | 166/309 |
| 3,249,535 | 5/1966 | Keil | 166/304 |
| 3,716,486 | 2/1973 | Perricone | 252/8.5 |
| 4,301,868 | 11/1981 | Schreubel et al. | 166/312 X |
| 4,374,733 | 2/1983 | Snyder et al. | 252/180 |
| 4,425,241 | 1/1984 | Swanson | 252/8.5 |
| 4,436,846 | 3/1984 | Krantz | 252/8.555 X |
| 4,446,042 | 5/1984 | Leslie | 252/528 X |
| 4,483,780 | 11/1984 | Llendo | 252/174.17 X |
| 4,493,773 | 1/1985 | Cook et al. | 252/174.17 X |
| 4,528,106 | 7/1985 | Grolitzer | 166/275 |
| 4,553,597 | 11/1985 | Le Ribault et al. | 252/8.554 |
| 4,603,738 | 8/1986 | Oberkirch et al. | 166/275 |
| 4,609,478 | 9/1986 | Egan | 252/8.554 |
| 4,617,129 | 10/1986 | Lees | 252/8.552 X |
| 4,663,069 | 5/1987 | Llenado | 252/174.17 X |
| 4,683,074 | 7/1987 | Malik et al. | 252/174.17 X |
| 4,834,903 | 5/1989 | Roth et al. | 252/174.17 |
| 4,856,588 | 8/1989 | Borchardt et al. | 166/275 |
| 4,913,828 | 4/1990 | Caswell et al. | 252/547 |
| 4,923,617 | 5/1990 | Heilweil et al. | 252/180 X |
| 4,985,154 | 1/1991 | Balzer et al. | 252/8.554 |
| 5,024,276 | 6/1991 | Borchardt et al. | 166/308 |
| 5,047,167 | 9/1991 | Steyn et al. | 252/174.17 X |

OTHER PUBLICATIONS

Urfer et al., "Akyl Polyglycosides:New Surfactants that meet detergent industry needs", Second World Conference on Detergents, Montreux, Switzerland 1986.

Rawn, J. D., *Biochemistry*, (New York: Harper & Row) 1983, Chapter 8. QP514.2.R39.

*Primary Examiner*—Gary Geist
*Attorney, Agent, or Firm*—Michael E. Martin

[57] ABSTRACT

Oil and gas wells and injection wells are cleaned of oil-based drilling muds, pipe thread compounds, other oil contaminants, cement and contaminants in injection water by a composition comprising fresh water or seawater, one-half to ten percent concentration of an alkyl polyglycoside surfactant and one to ten percent of a caustic agent such as sodium hydroxide, potassium hydroxide or ammonium hydroxide.

9 Claims, No Drawings

WELL CLEANOUT USING CAUSTIC ALKYL POLYGLYCOSIDE COMPOSITIONS

This is a continuation of application Ser. No. 07/863,529 filed Apr. 6, 1992, now abandoned, which is a continuation of application Ser. No. 07/647,867, filed Jan. 30, 1991, now abondoned.

BACKGROUND OF THE INVENTION

Field of the Invention

The present invention pertains to a cleanout composition and method for removing wellbore and well drilling equipment contaminants using a caustic alkyl polyglycoside solution.

Background

In the drilling and workover of oil and gas producing wells and certain types of fluid injection wells, it is necessary and desirable to clean out unwanted materials from the wellbore. For example, in the drilling and completion of an oil well, prior to perforating the casing in the formation region of interest, it is important to remove contaminants such as drilling fluids, pipe sealants/lubricants and other residues in the wellbore. Failure to perform the cleanout operation can result in contamination and plugging of the formation by the above-mentioned contaminants in the well. Wells which have already produced subterranean fluids and wells used for injection of fluids also, from time to time, require cleanup of the wellbore to remove contaminants such as hydrogen sulfide precipitates and injection water contaminants.

Although many types of surfactants have been used in wellbore cleanout processes, there is a continuing need for improved cleanout materials, in particular surfactant materials which will effectively remove the wellbore contaminants, provide for the lowest cost in relation to their performance capability, and which are preferably biodegradable and less toxic than prior art materials. It is to these ends that the present invention has been developed with a view to providing a superior surfactant formulation and method for wellbore and well drilling equipment cleaning.

SUMMARY OF THE INVENTION

The present invention provides a method and composition for cleaning out cased wellbores and the like using a cleanout fluid which includes an improved surfactant characterized by a caustic alkyl polyglycoside (APG) formulation. The APG surfactant, when added with a caustic agent to cleanout fluids such as fresh water, seawater or so-called well completion water containing up to 9.7 lbs/bbl potassium or sodium chloride, for example, provides an efficient and cost-effective well cleanout system.

The APG surfactant can also be included in weighted spacer fluids to perform a cleaning function during displacement from the wellbore of oil or water based drilling fluids.

DESCRIPTION OF PREFERRED EMBODIMENTS

U.S. Pat. Nos. 4,453,598 to Singer, et al., 4,474,240, 4,528,102, 4,588,031; 4,588,455 and 4,592,425, all to Oliver, Jr., et al. and 4,681,165 to Bannister, represent the state of the art with respect to well drilling fluid displacement and cleaning processes and compositions known to Applicant. The use of alkyl polyglycosides as surfactants in the laundry detergent industry is discussed in a paper entitled "Aikyl Polyglycosides: New Surfactants That Meet Detergent Industry Needs" by A.D. Urfer, et al., Second World Conference on Detergents; Montreux, Switzerland. 1986. This presentation discusses certain advantages of alkyl polyglycoside non-ionic surfactants with oil and water solubility features which meet the basic needs of the detergent industry.

Displacement processes for cleaning out cased wellbores prior to placement of a completion brine or prior to reinjection of injection fluids are important steps during well completion or restart. The use of solvents such as xylene and surfactant solutions is common practice to help achieve the required cleanliness in cased wellbores and well drilling equipment. The purpose of injecting surfactants into a cased wellbore, either through circulation into the wellbore area by way of a tubing string and return of the fluid up the annulus between the casing and the tubing string, or reverse circulation, is to obtain a very clean (e.g., turbidity reading of 20 ntu or less in the vicinity of the perforations) wellbore to minimize formation damage due to plugging of the perforated holes by dirts and greases suspended in the completion or injection fluids.

Caustic solutions aided by synthetic surfactants such as alkyl aryl sulfonates have been used in certain metal cleaning processes to remove the residual grease and dirt off of fabricated metal parts. However, the use of surfactants in combination with caustic materials to clean wellbores is not believed to have been tried due to the harsh environment of cased wellbore conditions, such as the high temperature conditions and the presence of high salinity, high hardness brines and residual oil based muds in the wellbore.

In accordance with the present invention, however, it has been discovered that alkyl polyglycoside (APG) surfactants which are non-ionic in nature, and which utilize the many hydroxyl groups in the polysaccharide chain to achieve hydrophilicity, in combination with caustic materials such as sodium hydroxide and potassium hydroxide may be particularly effective in removing oil-based drilling fluids, pipe thread sealant and lubricant materials and other contaminants in cased wellbores, including hydrocarbon substances such as diesel oil, crude oil and other naturally occurring formation fluids. These new compositions can also be effectively used to clean drilling equipment such as mud pumps, tanks and flow lines. The oil soluble portion of APG surfactants may be controlled by the alkyl chain length which can be varied from C6 to C18. Each saccharide group is typically equivalent to 5-7 ethylene oxide groups, and therefore is very effective in rendering water-soluble properties to APG surfactants even at high salinity and hardness conditions such as found in seawater. Still further, the APG surfactants have no cloud point constraint and appear to have no temperature limitation in the applications in question.

Another important property of the APG surfactants in accordance with the method of the present invention is that they remain very surface-active at very high pH and therefore can be used effectively as wetting, dispersing and emulsifying agents with a caustic solution. In accordance with the present invention, it is contemplated that the concentration of APG surfactant used in a wellbore cleaning composition and process should typically be in the range of one-half percent to ten percent by weight of the total composition and preferably 0.5 percent to 4.0 percent. The concentration of caustic materials should be in the range of about one percent to ten percent by weight of the total composition. As mentioned before, the water solubility and oil solubility requirements can be optimized by choosing the appropriate alkyl chain length or a mixture of alkyl chain length and/or the polysaccharide number in the molecule. Linear alkyl ethoxylate or alkyl phenol ethoxylate may be included as a cosurfactant.

Moreover, selected amounts (.25% to 1.5% by weight) of low molecular weight polymers such as sulfonated styrene maleic anhydride (SSMA), sulfonated vinyl toluene maleic anhydride (SVTMA) or sulfonated isobutylene maleic anhydride (SIMA) may be included in the composition to improve the dispersion of solid particles. Silicone-based antifoaming agents such as poly dimethyl siloxane may be added to the composition to control foaming and in the amount of several hundred ppm to a few thousand ppm.

Still further, it is contemplated that certain spacer fluids used in well cementing operations such as the fluids disclosed in U.S. patent application Ser. No. 07/441,853, filed November 27, 1989 by William N. Wilson, et al., and assigned to the assignee of the present invention, may include selected amounts of APG surfactant to perform wellbore cleaning during displacement of drilling fluids and other contaminants from the portion of the wellbore to be cemented.

A series of experiments was conducted to evaluate the effectiveness of a caustic/APG formulation to disperse and solubilize oil-based drilling muds, conventional pipe thread lubricant/sealant compounds and diesel oil filtrate of an oil-based drilling mud. Quantities of .20 gm of oil-based drilling mud cake, conventional pipe thread compound and diesel oil filtrate were added to 40 cc. sample vials, respectively, containing a 20.0 gm solution of APG surfactant dissolved in three percent (3%) potassium chloride brine with concentrations of sodium hydroxide of one, three, five and ten percent by weight. Each sample was heated to 140° F. in an oven, then taken out and handshaken moderately for 4 to 6 minutes while cooling to room temperature. The following results were obtained using surfactant concentrations of four percent by active weight, using commercially available APG surfactants from Henkel Corporation of Ambler, Pennsylvania, under their designations APG 225, APG 300, APG 325, APG 600 and APG 625.

The oil-based mud cake and pipe thread compound were broken down into chunky, coarse or fine dispersions of particulate materials, depending on the sodium hydroxide concentrations and APG surfactants used. At lower (one to three percent) concentrations of sodium hydroxide, the oil-based drilling mud cake and pipe thread compound were dispersed into either chunky or coarse materials, while at higher concentrations of caustic sodium hydroxide (three to ten percent by weight), the contaminants were dispersed into fine particulate materials. Tests conducted on these materials in the absence of APG surfactants resulted in no dispersion of the contaminant materials.

APG surfactants with longer alkyl lipophiles such as APG 600 (C12-C14-C16 alkyl chain lengths) gave good dispersion even at sodium hydroxide concentrations of one percent. Conversely, APG 225 (C8–C10 alkyl chain lengths) and APG 300 (C9, C10 and C11 alkyl chain lengths) required much higher caustic concentrations, in the range of three percent to ten percent sodium hydroxide to achieve similar results.

The above-mentioned tests on diesel oil filtrate also indicated better solubilization in solutions of APG surfactants with longer alkyl chain lengths than those with shorter alkyl chain lengths.

A second series of tests was conducted using a blend of APG surfactant from the above-mentioned group of commercially available surfactants with linear alkyl ethyoxylated alcohols as a cosurfactant. Results show that solubilization of the diesel oil filtrate can be further improved by substituting up to thirty percent by weight of APG surfactant of ethyoxylated alcohols in the surfactant blend having alkyl chain lengths of CS to C16.

A third series of tests was conducted to evaluate the effectiveness of a caustic/APG formulation in removing oil-based mud or pipe thread compound pastes from metal surfaces. A quantity of .20 gm of paste of each material was used in each case and smeared onto a piece of 4-inch long iron barn nail. Henkel Corporation's APG 300 (at 1.95 and 3.90 percent by weight) and APG 600 (at 2,275 and 4.55 percent by weight) surfactants were used with a three percent by weight caustic (sodium hydroxide) concentration showing a pH of 13.6. Each sample vial (40 cc. capacity) contained 20 gm of surfactant solution. The contaminated barn nail was put into the vial and heated to about 140° F. The vial was then shaken moderately in a horizontal back-and-forth motion, totally immersed in the solution, for about six minutes. Results indicate that excellent dispersion of the oil-based mud paste or the pipe thread compound paste by the caustic APG composition was achieved. The paste removal efficiency was comparable to that using organic hydrocarbon solvents, such as blends of paraffins and naphthene aromatics or blends of oxygenated aliphatic hydrocarbons in a 50/50 mix with water. It was also observed that while barn nails immersed in the aforementioned hydrocarbon solvent/water mixture corroded in 24 to 48 hours, no corrosion was observed with the nails exposed to the caustic/APG solutions.

By way of further example, an oil well is prepared for completion for displacing the drilling fluid remaining in the well by injecting down through a work tubing string a solution of water, a caustic agent composition selected from a group consisting of sodium hydroxide, potassium hydroxide and ammonium hydroxide in a range of one percent to ten percent by weight and a surfactant comprising an APG selected from a group consisting of an alkyl chain length having from C6 to C18 in a range from one-half percent to ten percent by weight of concentration in the solution. Forty to sixty barrels of water/surfactant/caustic agent solution is pumped at a rate of 3 to 4 bbl/min through the well and returned by way of the well annulus between the casing and the tubing string to clean the casing string and displace drilling fluid, pipe thread compound and other contaminants from the wellbore prior to perforation of the casing at the formation interval of interest. The composition is circulated through the drilling fluid circulation system, including pumps, tanks and flowlines to effect cleaning of these components also.

Although preferred embodiments of the invention have been described herein, those skilled in the art will recognize that various substitutions and modifications may be made to the method and composition without departing from the scope and spirit of the invention as recited in the appended claims.

What is claimed is:

1. A method for removing oil based material from a wellbore, said material comprising drilling fluid containing at least one of diesel oil and crude oil, comprising the steps of:

preparing a well washing composition comprising a vehicle selected from a group consisting of water, seawater and completion water, a surfactant comprising an alkyl polyglycoside of 1.0% to 10.0% by weight of said composition and a cosurfactant selected from a group consisting of linear alkyl ethoxylate and alkyl phenol ethoxylate; and circulating said washing composition through said wellbore to remove said material from said wellbore.

2. The method set forth in claim 1 including the step of:

providing said cosurfactant in an amount of up to about 30% by weight of the amount of said surfactant.

3. The method set forth in claim 1 including the step of:

providing a caustic agent in said washing composition selected from a group consisting of sodium hydroxide, potassium hydroxide and ammonium hydroxide in a range of from one percent to ten percent by weight of said washing composition.

4. The method set forth in claim 1 wherein:

said vehicle is provided as completion water containing up to about 9.7 pounds per barrel of one of sodium chloride, potassium chloride and ammonium chloride.

5. The method set forth in claim 1 including the step of:

providing a dispersant in said washing composition selected from a group consisting of SSMA, SVTMA and SIMA.

6. The method set forth in claim 1 including the step of:

providing an anti-foaming agent in said washing composition selected from a group consisting of polysiloxanes.

7. A method of preparing an oil well for completion by displacing drilling fluid remaining in the well concomitant with cleaning a tubing string extending within said well, an annulus formed in said well between a casing for said well and said tubing string and a drilling fluid circulation system for said well, comprising the steps of:

providing a composition comprising a solution of one of water and brine, a caustic agent selected from a group consisting of sodium hydroxide, potassium hydroxide and ammonium hydroxide in a range of one percent to ten percent by weight of said composition and a surfactant comprising an alkyl polyglycoside selected from a group consisting of an alkyl chain length having from C6 to C18 and in a concentration of 1.0% to 10.0% by weight of said composition;

mixing said one of water and brine, said caustic agent, and said surfactant to form said solution;

circulating said solution through said tubing string and said annulus to clean said tubing string and said casing and displace drilling fluid from said well prior to perforation of said casing at an earth formation interval of interest, and circulating said solution through said drilling fluid circulation system to effect cleaning thereof.

8. The method set forth in claim 7 including the step of:

pumping said solution through said well at a rate of about three to four barrels per minute.

9. A method of preparing an oil well for completion by displacing drilling fluid remaining in the well concomitant with cleaning a tubing string extending within said well, an annulus formed in said well between a casing for said well and said tubing string and a drilling fluid circulation system for said well, comprising the steps of:

circulating a composition comprising one of water and brine, a caustic agent selected from a group consisting of sodium hydroxide, potassium hydroxide and ammonium hydroxide in a range of one percent to ten percent by weight of said composition, a surfactant comprising an alkyl polyglycoside selected from a group consisting of an alkyl chain length having from C6 to C18 and in a concentration range of 1.0% to 10.0% by weight of said composition and a cosurfactant selected from a group consisting of linear alkyl ethoxylate and alkyl phenol ethoxylate through said tubing string and said annulus to clean said tubing string and said casing and displace drilling fluid from said well prior to perforation of said casing at an earth formation interval of interest, and circulating said composition through said drilling fluid circulation system to effect cleaning thereof.

* * * * *